O. L. BEYDLER.
SIGHTING ATTACHMENT FOR SQUARES.
APPLICATION FILED JULY 20, 1917.
1,264,146. Patented Apr. 30, 1918.
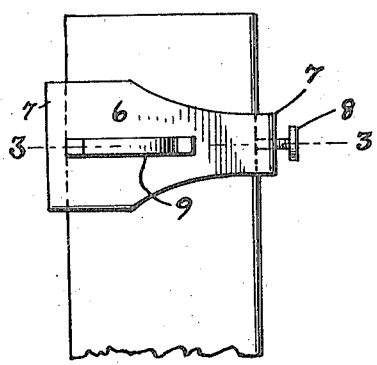
Fig. 1.
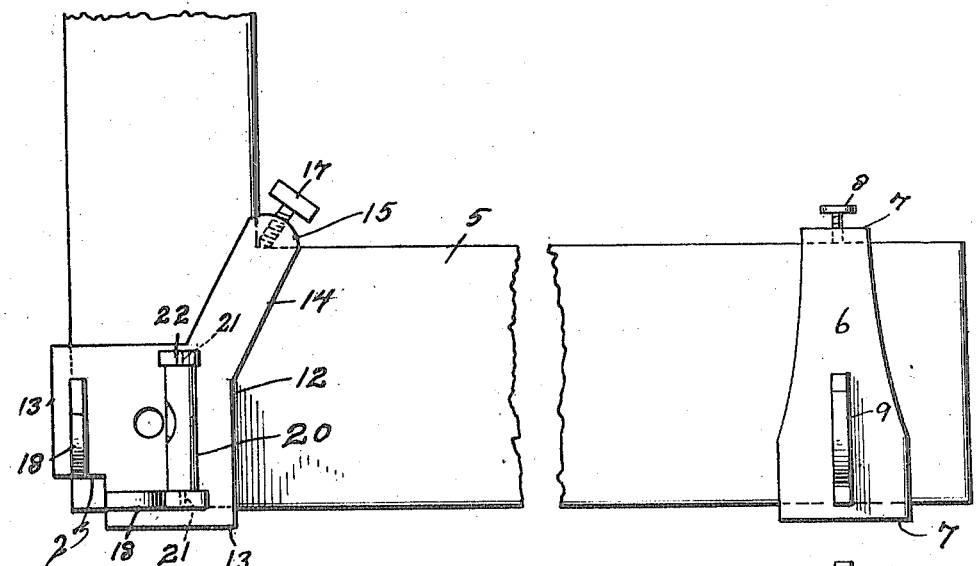
Fig. 2.
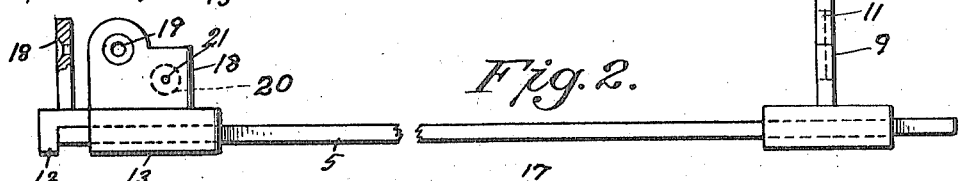
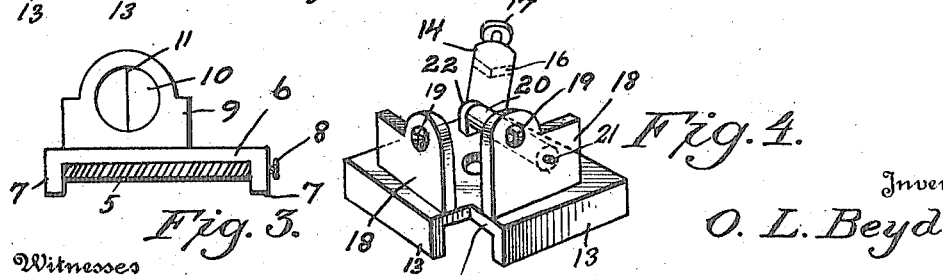
Fig. 3. Fig. 4.
Inventor
O. L. Beydler
Witnesses
By
Attorneys

UNITED STATES PATENT OFFICE.

OMAR L. BEYDLER, OF ST. AUGUSTINE, FLORIDA.

SIGHTING ATTACHMENT FOR SQUARES.

1,264,146.  Specification of Letters Patent.  Patented Apr. 30, 1918.

Application filed July 20, 1917.  Serial No. 181,778.

*To all whom it may concern:*

Be it known that I, OMAR L. BEYDLER, a citizen of the United States, residing at St. Augustine, in the county of St. Johns, State of Florida, have invented certain new and useful Improvements in Sighting Attachments for Squares; and I do hereby declare the following to be a full, clear, and exact description of the invention, such as will enable others skilled in the art to which it appertains to make and use the same.

This invention is an improvement in measuring instruments and has particular reference to sighting attachments for squares.

An object of the invention is to provide sighting attachments of improved construction to be used on squares whereby angles, elevations and levels may be secured for a desired distance and which are more particularly used in laying out foundations, running levels and taking sights along the walls of buildings.

Another object is to provide sight attachments which are simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a plan view of the square showing the attachments applied thereto and constructed in accordance with the invention.

Fig. 2 is an edge elevation.

Fig. 3 is a section on the line 3—3 of Fig. 1.

Fig. 4 is a detail perspective view of the sight attachment used for the corner of the square.

In the drawing the numeral 5 indicates a square made of any preferred material and constructed in the usual manner.

Each arm of the square has attached thereto adjacent its outer end an end sight 6 formed of a single piece of material extending transversely of the arm and provided at its ends with downturned flanges 7 which engage the longitudinal edges of the arm, one of said flanges having a set screw 8 mounted therein for attaching the sight to the arm so that the same may be readily and quickly adjusted to any desired position along the arm. Preferably extending longitudinally and centrally of the base of the sight the same is provided with a vertically arranged plate 9 having an opening 10 therein. Extending diametrically across said opening and arranged in a vertical plane is a sighting wire 11 which is adapted to be used in connection with the corner sighting member now to be described.

This corner sighting device preferably comprises a base 12 supported at the corner of the square and having upon its outer edge the downturned flanges 13 which engage the adjacent edges of the square to aid in retaining the base in proper position. The base 12 is provided with an arm 14 having a lug 15 at its free extremity, said lug having faces 16 disposed at right angles to each other and adapted to engage in the inner corner of the square 5 and be secured thereto by a set screw 17 thus providing an effective means for securely fastening the base to the square but at the same time permitting of a ready detachment therefrom when desired. Arranged in vertical planes and parallel with the flanges 13, respectively, of the base 12 the same is provided with the plates 18 having the sight openings 19 therein which are used in conjunction with the wires 11 carried by the sighting devices 6.

In practice, the device may have several uses. In laying out foundations the square is laid upon the top of the foundation and a sight is taken through either of the openings 19 to the wire 11 in alinement therewith and along the foundation to a stake or other object on which is marked the desired level.

With a level glass 20 fastened between one of the plates 18 and a lug 22 by extending detachable pins 23 through said plate and lug, the square may be used as a level. For this purpose the square is placed with the inner or outer edge of that arm of the square parallel with the axis of the glass against the surface to be leveled. When the square is to be used as a plumb the inner or outer edge of the other arm of the square is disposed against the surface to be made plumb.

The sight is notched as indicated at 23 in one corner thereof so that the corner of the square can be placed on a mark in running levels and lines.

What is claimed is:—

1. A sighting device for squares, comprising a base adapted to be mounted at the corner of the square, an arm extending from said base and having a portion engaging the inner corner of said square, means engaging said arm and said square for securing the base in position on said square, and plates extending vertically from said base and having sight openings therein.

2. A sighting device for squares, comprising a base adapted to be mounted at the corner of the square, an arm extending from said base and having a portion engaging the inner corner of said square, means engaging said arm and said square for securing the base in position, plates extending vertically from said base and having sight openings therein, and a level glass carried by said base.

3. A sighting device for squares comprising a base plate having flanges upon adjacent edges thereof adapted to engage the outer edges of a square, an arm extending from said base and having its free end provided with a lug having right angular faces adapted to engage the inner corner of said square, means extending through said lug for securing the base to said square, and plates carried by said base and having sight openings therein.

In testimony whereof, I affix my signature in the presence of two witnesses.

OMAR L. BEYDLER.

Witnesses:
E. B. CRAWFORD,
G. R. BLACK.

Copies of this patent may be obtained for five cents each, by addressing the "Commissioner of Patents, Washington, D. C."